United States Patent [19]

Scott et al.

[11] Patent Number: 4,488,341
[45] Date of Patent: Dec. 18, 1984

[54] METHOD OF MAKING A FLUID PRESSURE ACTUATOR

[75] Inventors: Douglas R. Scott; Frank Payne; Roscoe M. Ailor, all of Knoxville, Tenn.

[73] Assignee: Robertshaw Controls Company, Richmond, Va.

[21] Appl. No.: 408,150

[22] Filed: Aug. 16, 1982

[51] Int. Cl.³ .............................................. B23P 15/00
[52] U.S. Cl. ................... 29/156.4 R; 29/157 R; 29/407; 29/421 R; 72/59; 92/94; 92/103 M; 92/103 SD; 251/335 A; 264/510
[58] Field of Search ............... 29/156.4 R, 157 R, 454, 29/421 R, 407; 72/58, 59; 92/94, 98 R, 99, 101, 103 R, 103 SD, 103 M; 264/510, 553, DIG. 78; 251/335 A

[56] References Cited

U.S. PATENT DOCUMENTS

| | | | |
|---|---|---|---|
| 660,382 | 10/1900 | Lambert | 92/103 R X |
| 1,466,242 | 8/1923 | Neal | 92/103 M X |
| 1,898,848 | 2/1933 | O'Brien | 92/103 M X |
| 2,306,768 | 12/1942 | Wile | 92/94 |
| 2,591,852 | 4/1952 | Murray | 92/103 M X |
| 2,730,131 | 1/1956 | Asp et al. | 92/103 SD |
| 2,738,808 | 3/1956 | Hartzell et al. | 92/94 |
| 2,747,615 | 5/1956 | Tate | 92/103 M X |
| 2,912,951 | 11/1959 | Peters | 29/421 X |
| 2,916,255 | 12/1959 | Koehler | 92/103 R |
| 2,919,320 | 12/1959 | Edwards, Jr. et al. | 29/454 |
| 2,948,060 | 8/1960 | Engelberger | 29/445 X |
| 2,961,165 | 11/1960 | Whitenack | 92/103 M X |
| 3,049,931 | 8/1962 | Lang, Jr. et al. | 92/103 R X |
| 3,140,325 | 7/1964 | Graff | 264/510 |
| 3,321,823 | 5/1967 | Taplin | 29/445 X |
| 3,352,211 | 11/1967 | Jorgensen et al. | 29/454 X |
| 3,380,349 | 4/1968 | James | 92/44 X |
| 3,397,621 | 8/1968 | Groves | 92/103 R X |
| 3,503,307 | 3/1970 | Migdal | 92/103 M X |
| 3,566,650 | 3/1971 | Johnson | 29/421 X |
| 3,572,071 | 3/1971 | Semplak | 29/421 X |
| 3,874,052 | 4/1975 | Schantz | 92/103 SD X |
| 3,874,636 | 4/1975 | Bake et al. | 251/335 A |
| 3,924,518 | 12/1975 | Eberhard et al. | 29/454 X |
| 3,962,392 | 6/1976 | Conner, Jr. | 264/553 X |
| 3,997,052 | 12/1976 | Eddy et al. | 29/421 R |
| 3,999,266 | 12/1976 | Parker | 29/157.1 R |
| 4,028,455 | 6/1977 | Uede et al. | 264/510 X |
| 4,052,241 | 10/1977 | Walter | 264/510 X |
| 4,135,473 | 1/1979 | Frigo | 29/445 X |
| 4,199,850 | 4/1980 | Velan | 29/445 X |
| 4,230,662 | 10/1980 | Barnsbee | 264/553 |
| 4,256,019 | 3/1981 | Braddick | 92/94 |
| 4,268,945 | 5/1981 | Van Arman et al. | 29/407 |
| 4,270,964 | 6/1981 | Flaskett | 264/510 |
| 4,292,887 | 10/1981 | Ohta et al. | 92/94 |
| 4,306,639 | 12/1981 | Mitchell | 92/94 X |
| 4,364,161 | 12/1982 | Stading | 29/407 |
| 4,396,141 | 8/1983 | Miles | 29/454 X |

Primary Examiner—Charlie T. Moon
Assistant Examiner—Ronald S. Wallace
Attorney, Agent, or Firm—Candor, Candor & Tassone

[57] ABSTRACT

A fluid pressure actuator construction and method of making the same are provided, the method comprising the steps of forming a housing with an annular surface, securing an outer peripheral portion of a flexible diaphragm to the annular surface to define a fluid chamber with the housing whereby certain pressure differentials acting across the diaphragm cause movement thereof relative to the housing for actuation purposes or the like, and before the step of securing the diaphragm disposing a compression spring in the chamber to act between the housing and the diaphragm to tend to move the diaphragm in a direction away from the chamber, disposing a backup plate in the chamber so as to engage against the side of the diaphragm that faces the chamber, causing the spring to have one end thereof bearing against the backup plate, and forming the diaphragm to comprise a lamination having a polymeric layer defining the side thereof facing away from the chamber and a metallic layer defining the side thereof facing the chamber, and thereafter forming the diaphragm with an annular convolution adjacent the annular surface and inboard thereof by drawing the convolution in the diaphragm with a pressure differential created across the diaphragm after the diaphragm has been secured to the housing so as to have a convex side thereof facing the chamber.

11 Claims, 7 Drawing Figures

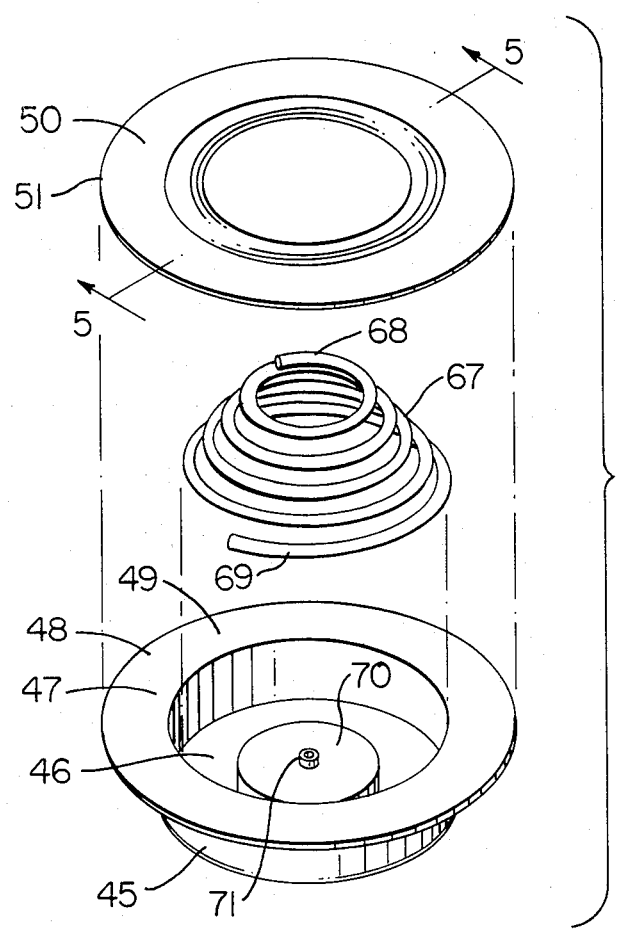
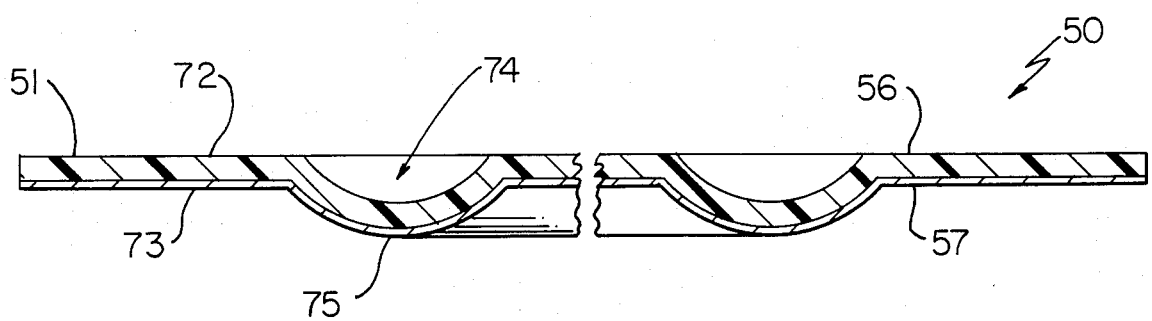

METHOD OF MAKING A FLUID PRESSURE ACTUATOR

BACKGROUND OF THE INVENTION

1. Field of the Invention

This invention relates to an improved fluid pressure actuator construction or the like and to a method of making such an actuator construction or the like.

2. Prior Art Statement

It is known to applicant to provide a fluid pressure actuator construction comprising a housing means having an annular surface means and a flexible diaphragm having an outer peripheral portion secured to the annular surface means and defining a fluid chamber with the housing means whereby certain pressure differentials acting across the diaphragm cause movement thereof relative to the housing means for actuation purposes or the like, the diaphragm comprising a lamination having a polymeric layer defining the side thereof facing away from the chamber and a metallic layer defining the side thereof facing the chamber. For example, see the copending patent application Ser. No. 401,875, filed July 26, 1982 of Peter J. Sacchetti.

It is also known to applicant to form an annular convolution in a flexible diaphragm after the same has been secured to the housing carrying the same by creating a pressure in the fluid chamber of the actuator construction to force a convolution in the diaphragm with the convex side thereof facing away from the fluid chamber.

SUMMARY OF THE INVENTION

It is one feature of this invention to provide an improved fluid pressure actuator construction or the like.

In particular, it was found according to the teachings of this invention that the flexible diaphragm of a fluid pressure actuator construction should have at least one annular convolution provided therein in order to prevent sufficient flexibility thereof when that diaphragm comprises a lamination having a polymeric layer that provides strength and flexibility for the diaphragm and a metallic layer defining the other side thereof for permitting the diaphragm to be hermetically sealed to a metallic housing means carrying the same so that fluid in the fluid chamber defined by the diaphragm and the housing means cannot migrate through such diaphragm and, thus, air or other fluids external to the diaphragm cannot migrate through such diaphragm to enter the chamber when the chamber is evacuated.

While it is found according to the teachings of this invention that such annular convolution can be preformed in such diaphragm before the same is assembled to the housing means carrying the same, it was unexpectedly found that if the diaphragm, in its unformed condition, is initially secured to the housing means after sufficient structure has been provided in the fluid chamber being defined thereby so that during a subsequent evacuation of the fluid chamber for leak testing purposes, the annular convolution will be drawn in such diaphragm and thereby not require the preforming of the convolution in the diaphragm that might lead to assembly problems.

For example, one embodiment of this invention provides a method of making a fluid pressure actuator construction comprising the steps of forming a housing means with an annular surface means, securing an outer peripheral portion of a flexible diaphragm to the annular surface means to define a fluid chamber with the housing means whereby certain pressure differentials acting across the diaphragm cause movement thereof relative to the housing means for actuation purposes or the like, and before the step of securing the diaphragm disposing a compression spring in the chamber to act between the housing means and the diaphragm to tend to move the diaphragm in a direction away from the chamber, disposing a backup plate in the chamber so as to engage against the side of the diaphragm that faces the chamber, causing the spring to have one end thereof bearing against the backup plate, and forming the diaphragm to comprise a lamination having a polymeric layer defining the side thereof facing away from the chamber and a metallic layer defining the side thereof facing the chamber, and thereafter forming the diaphragm with an annular convolution adjacent the annular surface means and inboard thereof by drawing the convolution in the diaphragm with a pressure differential created across the diaphragm after the diaphragm has been secured to the housing means so as to have a convex side thereof facing the chamber.

Accordingly, it is an object of this invention to provide an improved fluid pressure actuator construction having one or more of the novel features of this invention as set forth above or hereinafter shown or described.

Another object of this invention is to provide an improved method of making a fluid pressure actuator construction or the like, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 4 is an exploded perspective view illustrating certain parts of the fluid actuator constructions of FIGS. 2 and 3.

FIG. 5 is an enlarged cross-sectional view of the flexible diaphragm of the fluid pressure actuator construction of FIGS. 2-4.

DESCRIPTION OF THE PREFERRED EMBODIMENT

Figure 1:
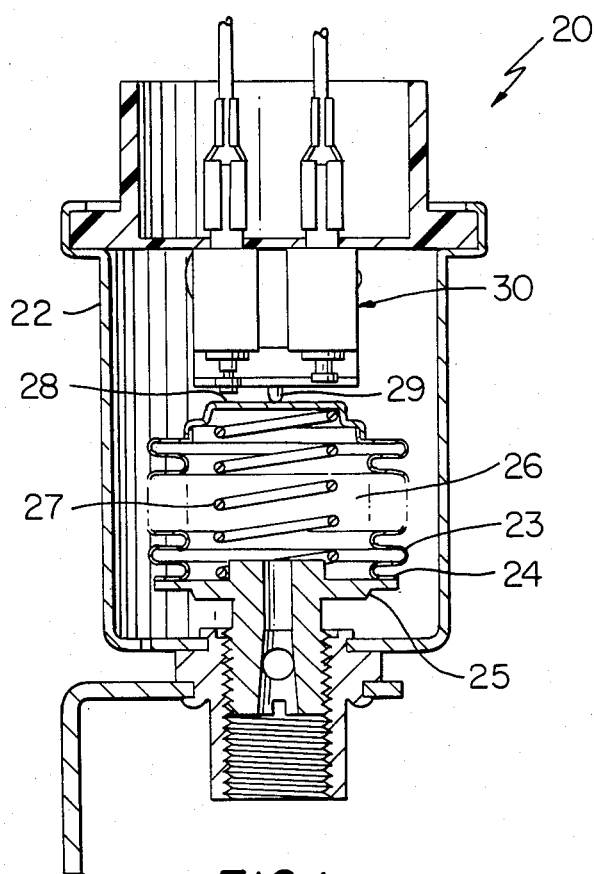
FIG. 1 is a cross-sectional view illustrating a prior art fluid pressure actuator construction.

While the various features of this invention are hereinafter illustrated and described as being particularly adapted to provide a particular type of fluid pressure actuator construction, it is to be understood that the various features of this invention can be utilized singly or in any combination thereof to provide fluid pressure actuator constructions of other configurations.

Therefore, this invention is not to be limited to only the embodiment illustrated in the drawings, because the drawings are merely utilized to illustrate one of the wide variety of uses of this invention.

Referring now to FIG. 1, a typical prior known fluid pressure actuating construction is generally indicated by the reference numeral 20 and includes a housing means 22 carrying a metallic bellows construction 23 having its open end 24 sealed to a metallic part 25 of the housing means 22 to cooperate therewith in defining a fluid chamber 26 that also contains a compression spring 27 whereby a movable wall 28 of the bellows construction 23 is adapted to operate an actuator means 29 of an electrical switch means 30 for operating the same when certain pressure differentials act across the wall 28 to cause movement thereof relative to the housing means 22 in a manner well known in the art.

The aforementioned copending patent application, Ser. No. 401,875, filed July 26, 1982 of Peter J. Sacchetti states that it is believed that the bellows construction 23 can be replaced by a flexible diaphragm if the flexible diaphragm comprises a lamination having a polymeric layer defining the side thereof facing away from the fluid chamber and a metallic layer defining the side thereof facing the chamber in order to provide a low cost alternate to actuator constructions that utilize formed or welded metal bellows constructions 23 and the like.

Accordingly, this copending patent application is being incorporated into this disclosure by this reference thereof as it is a feature of this invention to utilize the diaphragm of the aforementioned copending patent application in an improved manner as will be hereinafter set forth to provide a fluid pressure actuator construction of this invention.

In particular, reference is now made to FIGS. 2-4 wherein the fluid pressure actuator construction of this invention is generally indicated by the reference numeral 40 and comprises a housing means 41 formed from a plurality of housing parts 42, 43, 44 and 45 in a manner hereinafter set forth.

The housing part 45 comprises a cup-shaped metallic member having a closed end wall means 46 and an open end 47 defined by an outwardly extending annular flange 48 defining an annular flat surface means 49 facing away from the closed end wall 46.

A flexible diaphragm 50 of this invention has an outer peripheral portion 51 secured to the annular surface means 49 of the cup-shaped housing member 45 in a manner hereinafter set forth to cooperate therewith to define a fluid chamber 52 whereby certain pressure differentials acting across the diaphragm 50 cause movement thereof relative to the housing member 45 for actuating purposes and the like as hereinafter set forth.

Figure 3:
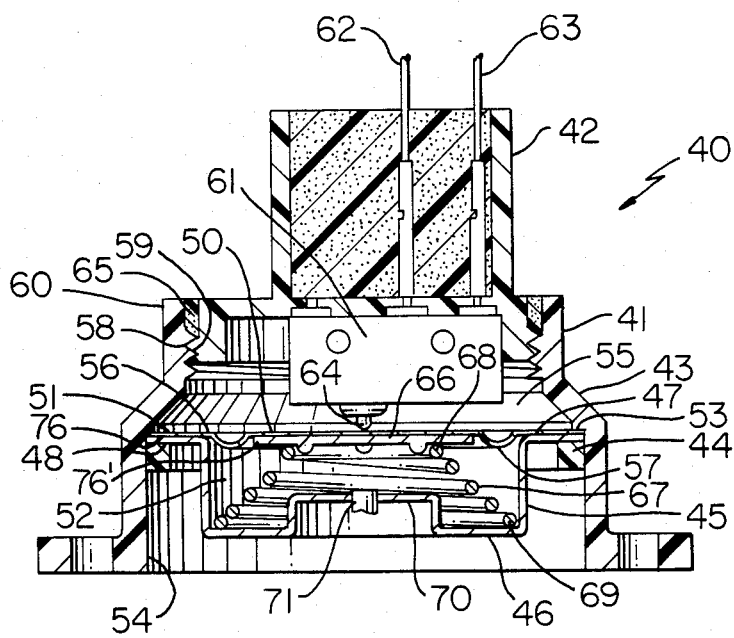
FIG. 3 is a cross-sectional view taken on line 3—3 of FIG. 2.

The housing member 43 has an internal annular shoulder 53 against which the outer peripheral portion 51 of the diaphragm 50 and the annular flange 48 of the housing member 45 are disposed in stacked relation and held thereto by the housing part 44 subsequently being disposed through the open end 54 of the housing member 43 as illustrated in FIG. 3 to be secured therein in any suitable manner and thereby hold the housing member 45 in the position illustrated in FIG. 3. In this manner, the flexible diaphragm 50 cooperates with the housing part 42 to define a chamber 55 in the housing means 43 on the side 56 of the diaphragm 50 while the opposite side 57 of the diaphragm 50 faces the internal chamber 52 previously described.

Figure 2:
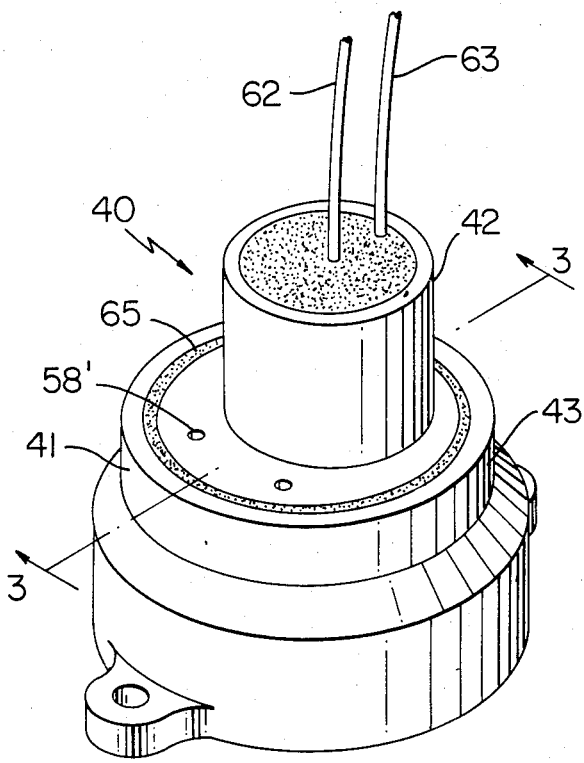
FIG. 2 is a perspective view illustrating the improved fluid pressure actuator construction of this invention.

The chamber 55 of the housing means 41 is vented to the atmosphere by suitable vent openings 58', FIG. 2, passing through the housing member 42.

The housing member 42 has an externally threaded portion 58 threadedly received in an internally threaded portion 59 of the housing member 43, the housing member 42 being inserted through an upper open end 60 of the housing member 43 as illustrated.

The housing part 42 carries an electrical switch 61 having suitable leads 62 and 63 extending therefrom and an actuating plunger 64 adapted to be engaged by the side 56 of the flexible diaphragm 50 as illustrated in FIG. 3 whereby movement of the diaphragm 50 causes movement of the actuator plunger 64 and, thus, the operation of the switch means 61 in a manner well known in the art.

By threadedly adjusting the axial position of the housing means 42 in the housing member 43, the position of the actuating plunger 64 relative to the diaphragm 50 can be set whereby the threaded relation between the housing parts 42 and 43 provide a calibration function for the fluid pressure actuating construction 40 in a manner well known in the art. Once the threaded position of the housing part 42 relative to the housing part 43 has been established, the housing part 42 can be secured in this adjusted fixed position to the housing part 43 by a suitable epoxy adhesive means 65 or the like.

A diaphragm backup plate 66 is disposed in the chamber 52 and engages against the side 57 of the diaphragm 50 at the central portion thereof as illustrated. In addition, a compression spring 67 is disposed in the chamber 52 and has one end 68 bearing against the backup plate 66 and the other end 69 thereof bearing against the closed end wall 46 of the housing member 45 whereby the force of the compression spring 67 tends to move the diaphragm 50 upwardly in FIG. 3.

The compression spring 67 defines a substantially frusto-conical configuration having its larger base defining the end 69 thereof while the smaller base thereof defines the end 68 as illustrated.

If desired, the closed end wall 46 of the housing member 45 can have a central offset portion 70 adapted to be telescoped inside the compression spring 67 and be provided with a filling and evacuating capillary tube 71 in a manner well known in the art and for a purpose hereinafter set forth.

It was found according to the teachings of this invention that the flexible diaphragm 50, when comprising a lamination having a polymeric layer 72, FIG. 5, defining the side 56 thereof that faces away from the chamber 52 and a metallic layer 73 defining the side 57 thereof that faces the chamber 52 for the reasons set forth in the aforementioned copending patent application, should have an annular convolution, that is generally indicated by the reference numeral 74, formed therein in such a manner that the convex side 75 of the convolution 74 will face into the chamber 52 with the convolution 74 being adjacent and inboard of the annular surface 49 of the housing member 45 and being adjacent and outboard of the outer peripheral portion 76' of the backup plate 66 as illustrated in FIG. 3. In this manner, it is believed that the diaphragm 50 is given sufficient flexibility for the necessary movement thereof to operate the actuating plunger 64 of the switch means 61 upon certain pressure differentials acting across the diaphragm 50 in a manner hereinafter set forth.

The polymeric layer 72 of the diaphragm 50 can comprise a polyimide containing material, such as a polyimide containing material sold under the trademark "KAPTON" by the Dupont Company of Wilmington, Del. and be approximately 0.002 of an inch thick. The metallic layer 73 of the diaphragm 50 can comprise a copper containing material clad to the polyimide layer 72 in a manner well known in the art and be approximately 0.000425 of an inch thick. In one embodiment of the actuator construction 40 of this invention, such diaphragm 50 had a diameter of approximately 1.500 inches and the cup-shaped housing member 45 was formed of brass.

In this manner, the metallic layer 73 of the diaphragm 50 cooperates with the metal cup-shaped member 45 to define the chamber 52 completely with metallic facing material so that any fluid in the chamber 52 and/or external to the chamber 52 will not migrate through the metallic surfaces of the cup-shaped member 45 and diaphragm 50.

In addition, the metallic layer 73 of the diaphragm 50 readily permits the diaphragm 50 to be secured to the metallic surface 49 of the cup-shaped housing member 45 by solder that is indicated by the reference numeral 76 in FIG. 3. For example, it has been found that the surface 49 of the annular flange 48 can be first tinned with the solder and then when the cup-shaped housing member 45 is suitably heated, such as with a torch or by induction, after the diaphragm 50 has had its periphery 51 placed against the surface means 49, the solder 76 subsequently secures the diaphragm 50 thereto.

However, a suitable epoxy adhesive means can be utilized to secure the metal layer 73 of the diaphragm 50 to the metallic surface 49 of the cup-shaped member 45, such as the well known epoxy adhesive means utilized to secure metal bellows constructions to their supporting structure, such as the open end 24 of the bellows construction 23 of FIG. 1 to the metallic part 25.

In any event, the securement of the diaphragm 50 to the cup-shaped member 45 heremetically seals the chamber 52 from the exterior thereof.

Figure 6:
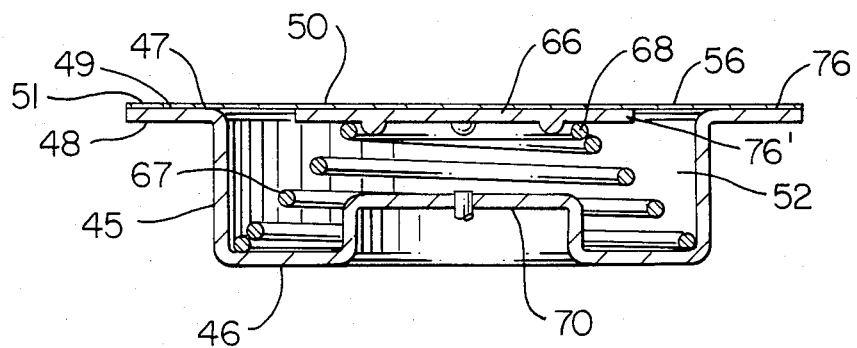
FIG. 6 is an enlarged cross-sectional view of part of the fluid pressure actuator construction of FIGS. 2-4 and illustrates one step in the method of this invention for forming the annular convolution in the diaphragm thereof.
Figure 7:
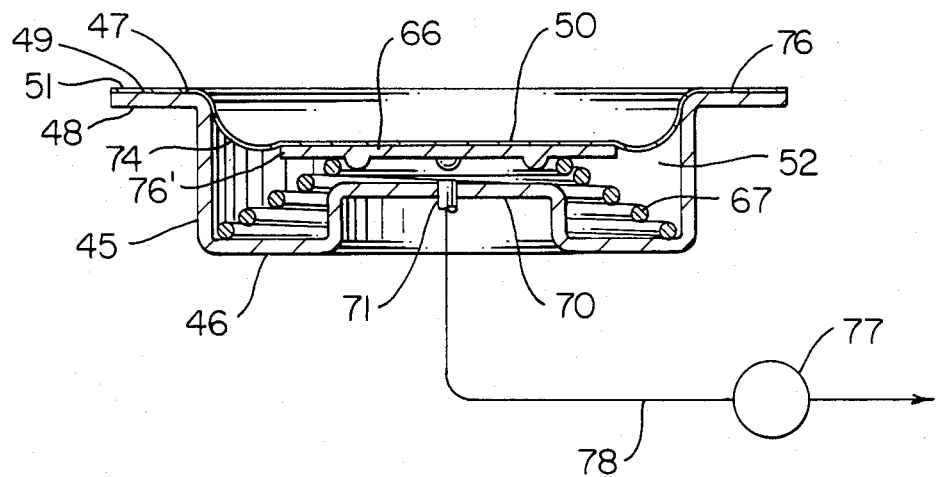
FIG. 7 is a view similar to FIG. 6 and illustrates another step in the method of this invention for forming the annular convolution in the diaphragm of the fluid pressure actuator construction of this invention.

While it is found according to the teachings of this invention that the convolution 74 can be preformed in the diaphragm 50 before the same is secured to the cup-shaped member 45 by the solder joint 76 previously described, such as by forming the convolution 74 with a metal female die disposed adjacent the surface 57 thereof and applying a rubber punch against the other surface 56 thereof, it was unexpectedly found according to the teachings of this invention that if the diaphragm 50 is first secured to the cup-shaped housing member 45 without having the convolution 74 formed therein in the manner illustrated in FIG. 6 so that the diaphragm 50 is completely straight across the open end 47 of the cup-shaped member 45 even though the backup plate 66 and compression spring 67 have been assembled in the chamber 52 as illustrated in FIG. 6, a subsequent evacuation of the chamber 52 to test the diaphragm 50 and cup-shaped member 45 for leakage before the same are assembled in the member 43 will cause the convolution 74 to be drawn into the diaphragm 50 during such leak testing operation in the manner illustrated in FIG. 7 because of the resulting pressure differential acting across the diaphragm 50 as the diaphragm 50 is being pulled downwardly toward the end wall 46 by the evacuation of the chamber 52 by suitable vacuum means 77 interconnected to the capillary conduit 71 by a conduit means 78.

In particular, in order to test the diaphragm 50 and housing member 45 after the same have been secured together, the chamber 52 is substantially completely evacuated and then back charged with helium to an absolute pressure of approximately one and one-half inch Hg so that suitable sensing equipment can determine whether any helium molecules leak from the chamber 52. It was found that this force created by the evacuation of the chamber 52 is sufficient to form the convolution 74 in the diaphragm 50 once further downward movement of the central portion of the diaphragm 50 is prevented by the subsequently compressed compression spring 67 as illustrated in FIG. 7 whereby the convolution 74 is permanently formed in the diaphragm 50 and is thus accurately disposed intermediate the surface 49 of the housing member 45 and the outer peripheral portion 76' of the backup plate 66 as illustrated in FIG. 7.

At the time the helium has been inserted in the chamber 52, the capillary tube 71 can be crimped closed and sealed by being inserted into a bath of solder whereby the chamber 52 is sealed and can act as a barometric sensing means.

In particular, when the actuator construction 40 of FIG. 3 is being utilized, such as in a transportation vehicle or the like, a change in pressure across the diaphragm 50 through a change in altitude of the vehicle, causes the diaphragm 50 to move upwardly and thereby operate the plunger 64 of the switch means 61 so that the switch means 61 will be in one condition thereof when the actuator construction 40 reaches a certain higher altitude. A subsequent decrease in altitude of the device 40 causes the diaphragm 50 to move downwardly and operate the plunger 64 to place the switch means 61 in another condition thereof in a manner well known in the art.

It may be found that when evacuating the chamber 52, a helium atmosphere can be disposed external to the chamber 52 in order to test for leakage through the diaphragm 50 and housing member 45 without requiring a back fill of helium into the chamber 52 as previously described. Nevertheless, the convolution 74 will still be formed in the diaphragm 50 in the manner previously described by the evacuation process.

Therefore, it can be seen that this invention not only provides an improved fluid pressure actuator construction, but also this invention provides an improved method of making such a fluid pressure actuator construction or the like.

While the form and method of this invention now preferred have been illustrated and described as required by the Patent Statute, it is to be understood that other forms and method steps can be utilized and still fall within the scope of the appended claims.

What is claimed is:

1. In a method of making a fluid pressure actuator construction comprising the steps of forming a housing means with an annular surface means, securing an outer peripheral portion of a flexible diaphragm to said annular surface means to define a fluid chamber with said housing means whreby certain pressure differentials acting across said diaphragm cause movement thereof relative to said housing means for actuation purposes or the like, and before said step of securing said diaphragm disposing a compression spring in said chamber to act between said housing means and said diaphragm to tend to move said diaphragm in a direction away from said chamber, disposing a backup plate in said chamber so as to engage against said side of said diaphragm that faces said chamber, causing said spring to have one end thereof bearing against said backup plate, and forming said diaphragm to comprise a lamination having a polymeric layer defining the side thereof facing away from said chamber and a metallic layer defining the side thereof facing said chamber, the improvement comprising the step of forming said diaphragm with an annular convolution adjacent said annular surface means and inboard thereof by drawing said convolution in said diaphragm with a pressure differential created across said diaphragm after said diaphragm has been secured to said housing means so as to have a convex side thereof facing said chamber.

2. A method of making a fluid pressure actuator construction as set forth in claim 1 wherein said step of forming said convolution comprises the step of creating said pressure differential by evacuating said chamber to a certain level.

3. A method of making a fluid pressure actuator construction as set forth in claim 2 and including the steps of thereafter injecting a certain amount of a test fluid in said evacuated chamber, and testing for leakage of said test fluid from said chamber.

4. A method of making a fluid pressure actuator construction as set forth in claim 3 and including the steps of surrounding said actuator construction with a test fluid, and thereafter testing for leakage of said test fluid into said evacuated chamber.

5. A method of making a fluid pressure actuator construction as set forth in claim 1 wherein said step of forming said convolution causes said convolution to be disposed adjacent and outboard of said backup plate.

6. A method of making a fluid pressure actuator construction as set forth in claim 5 and including the steps of forming said housing means to comprise a cup-shaped metallic housing member having a closed end and an open end, and forming said open end to define said annular surface means whereby said diaphragm closes said open end.

7. A method of making a fluid pressure actuator construction as set forth in claim 6 and including the steps of causing another end of said spring to bear against said closed end of said cup-shaped housing member, and forming said spring to define a substantially frusto-conical configuration with its larger base bearing against said closed end of said cup-shaped housing member.

8. A method of making a fluid pressure actuator construction as set forth in claim 1 and including the steps of forming said annular surface means to comprise a metallic surface means, and securing said metallic layer of said diaphragm to said metallic surface means with solder.

9. A method of making a fluid pressure actuator construction as set forth in claim 1 and including the steps of forming said annular surface means to comprise a metallic surface means, and securing said metallic layer of said diaphragm to said metallic surface means with adhesive means.

10. A fluid pressure actuator construction as set forth in claim 1 and including the step of forming said polymeric layer of said diaphragm to comprise a layer of polyimide containing material and said metallic layer of said diaphragm to comprise a layer of copper containing material.

11. A method of making a fluid pressure actuator construction as set forth in claim 10 and including the step of forming said layer of polyimide containing material to be approximately 0.002 of an inch thick and said layer of copper containing material to be approximately 0.000425 of an inch thick.

* * * * *